US012563080B2

(12) United States Patent
Nagara

(10) Patent No.: US 12,563,080 B2
(45) Date of Patent: Feb. 24, 2026

(54) ATTACK ESTIMATION VERIFICATION DEVICE, ATTACK ESTIMATION VERIFICATION METHOD, AND STORAGE MEDIUM STORING ATTACK ESTIMATION VERIFICATION PROGRAM

(71) Applicant: DENSO CORPORATION, Kariya (JP)

(72) Inventor: Keigo Nagara, Kariya (JP)

(73) Assignee: DENSO CORPORATION, Kariya (JP)

( * ) Notice: Subject to any disclaimer, the term of this patent is extended or adjusted under 35 U.S.C. 154(b) by 287 days.

(21) Appl. No.: 18/353,152

(22) Filed: Jul. 17, 2023

(65) Prior Publication Data

US 2024/0039949 A1 Feb. 1, 2024

(30) Foreign Application Priority Data

Jul. 26, 2022 (JP) ................................. 2022-119114

(51) Int. Cl.
 *H04L 9/40* (2022.01)
(52) U.S. Cl.
 CPC ........ *H04L 63/1433* (2013.01); *H04L 63/105* (2013.01); *H04L 63/1425* (2013.01); *H04L 63/1458* (2013.01)
(58) Field of Classification Search
 USPC ........................................................ 726/22
 See application file for complete search history.

(56) References Cited

U.S. PATENT DOCUMENTS

| | | | | |
|---|---|---|---|---|
| 10,848,515 B1 * | 11/2020 | Pokhrel | ............... | H04L 63/1433 |
| 12,106,610 B2 * | 10/2024 | Hirano | ................. | G07C 5/0808 |
| 12,107,876 B2 * | 10/2024 | Kishikawa | ............. | H04L 63/02 |
| 2020/0053112 A1 * | 2/2020 | Torisaki | ............. | H04L 63/1425 |
| 2020/0267171 A1 * | 8/2020 | Mozumdar | ............. | G06N 7/01 |
| 2022/0309153 A1 | 9/2022 | Nagara et al. | | |

FOREIGN PATENT DOCUMENTS

| | | | | |
|---|---|---|---|---|
| JP | 2016-143320 A | 8/2016 | | |
| JP | 2020-123307 A | 8/2020 | | |
| JP | 2022-153081 A | 10/2022 | | |
| WO | WO-2017104112 A1 * | 6/2017 | ............. | H04L 67/12 |

* cited by examiner

*Primary Examiner* — Sakinah White Taylor
(74) *Attorney, Agent, or Firm* — Harness, Dickey & Pierce, P.L.C.

(57) ABSTRACT

By an attack estimation verification device, an attack estimation verification method, and a computer-readable non-transitory storage medium storing an attack estimation verification program, an attack-abnormality relation table is stored, a security log is acquired, an attack received by an electronic control system is estimated, it is determined whether grouping or an assumption feature of an abnormal electronic control unit is appropriate, and a notification indicating a verification result is provided.

13 Claims, 10 Drawing Sheets

FEATURE NUMBER INFORMATION = 1

| ECU IDENTIFICATION NUMBER | LAYER INFORMATION | ACTUAL FEATURE | ASSUMPTION FEATURE | GROUP INFORMATION |
|---|---|---|---|---|
| VM111 | FIRST LAYER | CAN1,CAN2 | - | G-01 |
| VM112 | SECOND LAYER | CAN3,CAN4 | - | G-02 |
| ECU12 | FIRST LAYER | CAN1 | CAN2 | G-01 |
| ECU13 | FIRST LAYER | CAN1,CAN2 | - | G-01 |
| ECU14 | SECOND LAYER | CAN3 | CAN4 | G-02 |
| ECU15 | SECOND LAYER | CAN3 CAN4 | - | G-02 |
| ECU16 | THIRD LAYER | CAN4,CAN5 | - | G-03 |
| ECU17 | THIRD LAYER | CAN5 | CAN4 | G-03 |

201 INV LOG

202 INFO ACQ

203 TABLE STORAGE

204 GROUP DET

205 OUTPUT

SECURITY LOG (AK EST LOG GENERATION DEVICE)

FIG. 5

FEATURE NUMBER INFORMATION = 1

| ECU IDENTIFICATION NUMBER | LAYER INFORMATION | ACTUAL FEATURE | ASSUMPTION FEATURE | GROUP INFORMATION |
|---|---|---|---|---|
| VM111 | FIRST LAYER | CAN1, CAN2 | - | G-01 |
| VM112 | SECOND LAYER | CAN3, CAN4 | - | G-02 |
| ECU12 | FIRST LAYER | CAN1 | CAN2 | G-01 |
| ECU13 | FIRST LAYER | CAN1, CAN2 | - | G-01 |
| ECU14 | SECOND LAYER | CAN3 | CAN4 | G-02 |
| ECU15 | SECOND LAYER | CAN3 CAN4 | - | G-02 |
| ECU16 | THIRD LAYER | CAN4, CAN5 | - | G-03 |
| ECU17 | THIRD LAYER | CAN5 | CAN4 | G-03 |

FIG. 6

FEATURE NUMBER INFORMATION = 2

| ECU IDENTIFICATION NUMBER | LAYER INFORMATION | ACTUAL FEATURE | ASSUMPTION FEATURE | GROUP INFORMATION |
|---|---|---|---|---|
| VM111 | FIRST LAYER | FN A | FN B, FN C | G-01 |
| VM112 | SECOND LAYER | FN A | FN D, FN E | G-02 |
| ECU12 | FIRST LAYER | FN A, FN C | FN B | G-01 |
| ECU13 | FIRST LAYER | FN C | FN A, FN B | G-01 |
| ECU14 | SECOND LAYER | FN A, FN D | FN E | G-02 |
| ECU15 | SECOND LAYER | FN D | FN A, FN E | G-02 |
| ECU16 | THIRD LAYER | FN B | FN F | G-03 |
| ECU17 | THIRD LAYER | FN F | FN B | G-03 |

100 (AK EST VERIFICATION DEVICE)

101 AK EST LOG ACQ

104 AK EST

105 VERIFICATION

106 NOTIFICATION

102 RELATION TABLE STORAGE

103 FEATURE TABLE STORAGE

FIG. 9

| AK TYPE | AK START POINT | AK TARGET | ABL CONTENTS | | | | | | | |
|---|---|---|---|---|---|---|---|---|---|---|
| | | | ABL A | ABL B | ABL C | ABL A | ABL D | ABL E | ABL B | ABL F |
| | | | G-01 | | | G-02 | | | G-03 | |
| AK A | G-00 | G-01 | ○ | — | ○ | — | — | — | — | — |
| AK B | G-01 | G-02 | — | — | ○ | ○ | — | ○ | — | — |
| AK C | G-02 | G-02 | — | — | — | — | ○ | ○ | — | — |
| AK D | G-02 | G-03 | — | — | — | ○ | ○ | ○ | — | ○ |
| … | | | | | | | | | | |
| AK X | G-02 | G-03 | — | — | — | — | — | — | ○ | ○ |

ATTACK ESTIMATION VERIFICATION DEVICE, ATTACK ESTIMATION VERIFICATION METHOD, AND STORAGE MEDIUM STORING ATTACK ESTIMATION VERIFICATION PROGRAM

CROSS REFERENCE TO RELATED APPLICATION

The present application claims the benefit of priority from Japanese Patent Application No. 2022-119114 filed on Jul. 26, 2022. The entire disclosure of the above application is incorporated herein by reference.

TECHNICAL FIELD

The present disclosure relates to an attack estimation verification device, an attack estimation verification method, and a storage medium storing an attack estimation verification program for estimating an attack on an electronic control system mounted in a mobile object such as an automobile and verifying the estimation result.

BACKGROUND

In recent years, technologies for driving support and automated driving control, including V2X such as vehicle-to-vehicle communication and road-to-vehicle communication, have been attracting attention. Along with this, vehicles have come to be equipped with a communication function, and vehicles are becoming more connected. As a result, a probability that a vehicle may receive a cyberattack such as unauthorized access is increasing. Therefore, it is necessary to analyze cyberattacks on vehicles and to construct countermeasures against them.

SUMMARY

By an attack estimation verification device, an attack estimation verification method, and a computer-readable non-transitory storage medium storing an attack estimation verification program, an attack-abnormality relation table is stored, a security log is acquired, an attack received by an electronic control system is estimated, it is determined whether grouping or an assumption of an abnormal electronic control unit is appropriate, and a notification indicating a verification result is provided.

BRIEF DESCRIPTION OF DRAWINGS

FIG. 4 is a block diagram showing a configuration example of an attack estimation log generation device according to the first and second embodiments.

FIG. 5 is a diagram showing one example of a feature table according to the first and second embodiments.

FIG. 6 is a diagram showing one example of a feature table according to the first and second embodiments.

FIG. 9 is a diagram showing an example of an attack-abnormality relation table according to the first and second embodiments.

DETAILED DESCRIPTION

Figure 1:
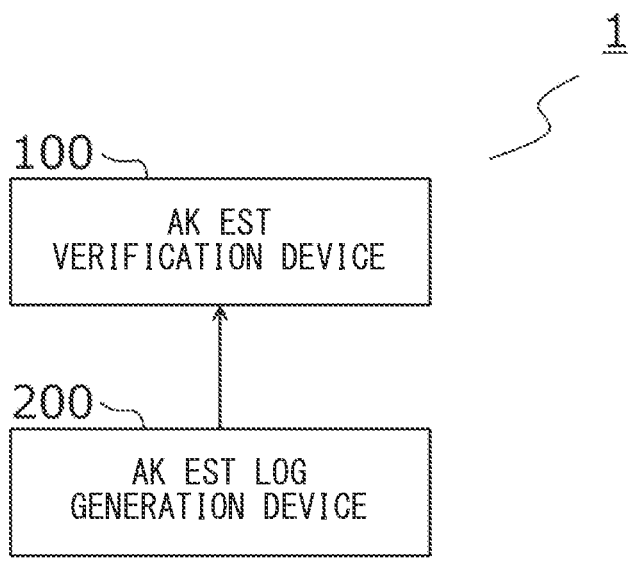
FIG. 1 is a block diagram showing a configuration example of an attack analysis system according to a first embodiment.

There are various technologies for detecting abnormalities occurring in vehicles and analyzing cyberattacks based on the detected abnormalities. In a comparative example, detected abnormal data is collected, a combination of items in which the abnormalities are detected is compared with an abnormality detection pattern specified in advance for each attack, and the type of attack corresponding to the abnormality is specified.

However, the configuration of the electronic control system mounted in the vehicle varies depending on the vehicle type, model year, and manufacturer. Therefore, the items, for which abnormalities are detected by cyberattacks, and the locations, where abnormalities occur, may differ depending on the configuration of the electronic control system. Therefore, in order to specify the cyberattacks using a combination of items in which the abnormalities are detected, it is necessary to set abnormality detection patterns and analysis rules for each electronic control system configuration. However, in recent years, the number of electronic control units that configures an electronic control system is increasing as vehicles become more multi-functional. Therefore, when the abnormality detection patterns and analysis rules corresponding to many electronic control units are set, the process load increases, and the increase is not preferable from the standpoint of development and maintenance.

Therefore, as a result of detailed studies by the present inventor, a method has been found. In the method, by dividing multiple electronic control units that configures the electronic control system into several groups and setting an abnormality detection pattern and an analysis rule for each group, it is possible to reduce an analysis process of the cyberattacks on the electronic control unit. According to this method, it is possible to reduce the number of abnormality detection patterns or analysis rules set for the entire electronic control system. Further, by grouping electronic control units so that common abnormality detection pattern and the common analysis rule can be applied to multiple electronic control systems with different configurations, it is possible to analyze the cyberattacks regardless of the electronic control system configuration. However, when electronic control units are not grouped appropriately, attacks may not be analyzed accurately. Therefore, when analyzing the cyberattacks using such methods, it is desirable to verify whether the grouping of electronic control units is appropriate.

Therefore, one example of the present disclosure provides a device, a method, a storage medium storing a program capable of verifying whether an analysis method is appropriate after dividing multiple electronic control units configuring an electronic control system into multiple groups and analyzing cyberattacks.

According to one example embodiment of the present disclosure, an attack estimation verification device includes: a log acquisition unit configured to acquire a security log including: identification information indicating an abnormal electronic control unit that is an electronic control unit in which an abnormality is detected among multiple electronic control units configuring an electronic control system; abnormality information indicating the abnormality detected in the abnormal electronic control unit; and group information indicating a group which is obtained by grouping at least one electronic control unit among the multiple electronic control units according to an actual feature of each of the multiple electronic control units and an assumption feature of each of the multiple electronic control units, and to which the abnormal ECU belongs; an attack-abnormality relation table storage that stores an attack-abnormality relation table indicating a relation among attack information indicating a type of an attack, prediction abnormality information indicating an abnormality predicted to occur due to the attack, and prediction group information indicating a group in which the predicted abnormality occurs; an attack estimation unit configured to estimate an attack received by the electronic control system based on a prediction combination of the prediction abnormality information and the prediction group information, the prediction group corresponding to a combination of the abnormality information and the group information; a verification unit configured to determine that grouping of the group or an assumption feature of the abnormal electronic control unit indicated by the identification information is not appropriate when the attack estimated by the attack estimation unit is an attack related to the assumption feature of the abnormal electronic control unit indicated by the identification information; and a notification unit configured to provide a notification indicating a verification result by the verification unit.

According to another example embodiment, an attack estimation verification method is executed by an attack estimation verification device including an attack-abnormality relation table storage that stores an attack-abnormality relation table indicating a relation among attack information indicating a type of an attack, prediction abnormality information indicating an abnormality predicted to occur due to the attack, and prediction group information indicating a group in which the predicted abnormality occurs. The method includes: acquiring a security log including: identification information indicating an abnormal electronic control unit that is an electronic control unit in which an abnormality is detected among a plurality of electronic control units configuring an electronic control system; abnormality information indicating an abnormality detected in the abnormal electronic control unit; and group information indicating a group which is obtained by grouping at least one electronic control unit among the plurality of electronic control units according to an actual feature of each of the plurality of electronic control units and an assumption feature of each of the plurality of electronic control units, and to which the abnormal ECU belongs; estimating an attack received by the electronic control system based on a prediction combination of the prediction abnormality information and the prediction group information, the prediction group corresponding to a combination of the abnormality information and the group information; determining that grouping of the group or an assumption feature of the abnormal electronic control unit indicated by the identification information is not appropriate when the estimated attack is an attack related to the assumption feature of the abnormal electronic control unit indicated by the identification information; and providing a notification indicating a verification result.

Further, according to another example embodiment, a computer-readable non-transitory storage medium stores an attack estimation verification program executed by an attack estimation verification device including an attack-abnormality relation table storage that stores an attack-abnormality relation table indicating a relation among attack information indicating a type of an attack, prediction abnormality information indicating an abnormality predicted to occur due to the attack, and prediction group information indicating a group in which the predicted abnormality occurs. The program causes a processor to: acquire a security log including: identification information indicating an abnormal electronic control unit that is an electronic control unit in which an abnormality is detected among multiple electronic control units configuring an electronic control system; abnormality information indicating an abnormality detected in the abnormal electronic control unit; and group information indicating a group which is obtained by grouping at least one electronic control unit among the multiple electronic control units according to an actual feature of each of the multiple electronic control units and an assumption feature of each of the multiple electronic control units and to which the abnormal ECU belongs; estimate an attack received by the electronic control system based on a prediction combination of the prediction abnormality information and the prediction group information, the prediction group corresponding to a combination of the abnormality information and the group information; determine that grouping of the group or an assumption feature of the abnormal electronic control unit indicated by the identification information is not appropriate when the estimated attack is an attack related to the assumption feature indicated by the identification information; and provide a notification indicating a verification result.

According to the above configurations, it is possible to reduce the process load required for the analysis of the cyberattacks on the electronic control system and easily perform development and the maintenance. In addition, by verifying whether the attack analysis method is appropriate, it becomes possible to perform the appropriate analysis method using the appropriate analysis method, and accurately analyze the abnormality when the abnormality occurs in the electronic control system.

Hereinafter, embodiments of the present disclosure will be described with reference to the drawings.

1. First Embodiment (1) Attack Analysis System
(a) Configuration of Attack Analysis System FIG. 1 is a diagram schematically illustrating a configuration of an attack analysis system 1 according to the present embodiment. The attack analysis system 1 includes an attack estimation verification device 100 and an attack estimation log generation device 200. In the drawings, the terms of "attack" and "estimation" may be also referred to as "AK" and "EST", respectively. The attack estimation verification device 100 is a device that estimates a cyberattack on an electronic control system S described later and verifies the estimation result. The attack estimation log generation device 200 is a device that generates a log necessary for the attack estimation verification device 100 to estimate the cyberattack.

(b) Arrangement of Attack Analysis System and Electronic Control System

Figure 2:
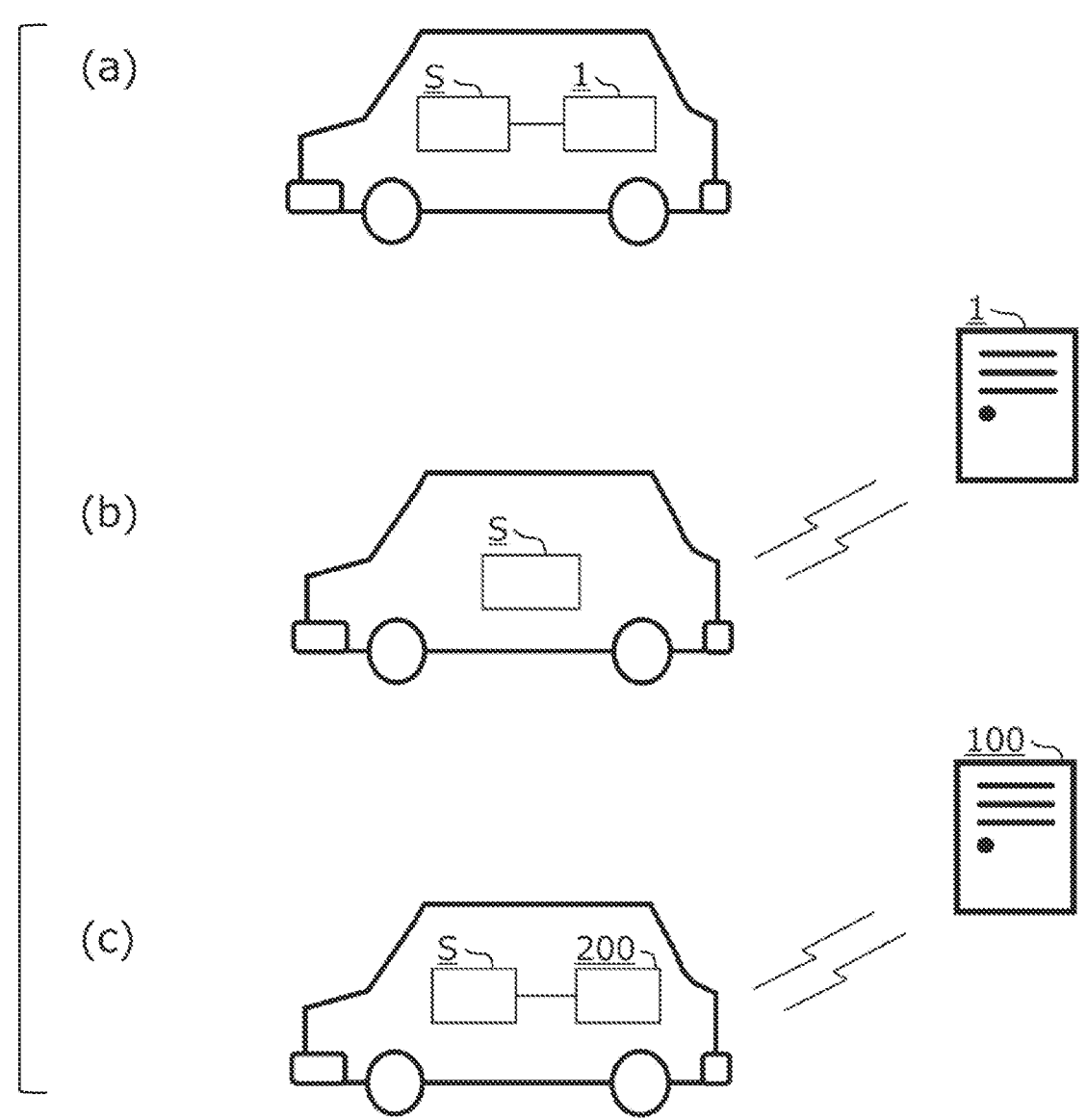
FIG. 2 is an explanatory diagram illustrating an arrangement of the attack analysis system according to the first embodiment.

FIG. 2 is a diagram illustrating the arrangement of the attack analysis system 1 and the electronic control system S according to the present embodiment. The attack analysis system 1 can take any arrangement so as to obtain necessary information from the electronic control system S. Hereinafter, the cyberattack is abbreviated as the attack. Further, based on the viewpoint from the electronic control system S that is affected by the attack, the attack may be also referred to as an abnormality.

For example, as shown in FIG. 2, three cases are assumed. As shown in a part (a) of FIG. 2, in the first case, the electronic control system S and the attack analysis system 1 are "mounted" in a vehicle that is a "mobile object". As shown in a part (b) of FIG. 2, in the second case, the electronic control system S is "mounted" in the vehicle that is the "mobile object", and the attack analysis system 1 is implemented by a server device placed outside the vehicle. As shown in a part (c) of FIG. 2, in the third case, the attack estimation log generation device 200 in the attack analysis system 1 is "mounted" in the vehicle that is the "mobile object", and only the attack estimation verification device 100 in the attack analysis system 1 is implemented by the server device.

The "mobile object" refers to a movable object, and a travel speed is arbitrary. Here, this also includes a case where the mobile object is stopped. Examples of the mobile object include automobiles, motorcycles, bicycles, pedestrians, ships, aircrafts, and objects mounted thereon. However, the mobile object may not be limited to these features.

Further, the term "mounted" includes not only a case where an object is directly fixed to the mobile object but also a case where an object is moved together with the moving object although the object is not fixed to the mobile object. For example, the case may be a case where a person riding on the mobile object carries the object, or a case where the object is mounted on a load placed on the mobile object.

In the case of the part (a) of FIG. 2, the attack analysis system 1 and the electronic control system S are connected by an in-vehicle network such as CAN (Controller Area Network) or LIN (Local Interconnect Network). Alternatively, connection can be made using any communication method, for example, wired or wireless communication, such as Ethernet (registered trademark), Wi-Fi (registered trademark), or Bluetooth (registered trademark). In another example, at least one of the electronic control units configuring the electronic control system S may incorporate the functions of the attack estimation verification device 100 and the attack estimation log generation device 200.

In the case of the part (a) of FIG. 2, when the electronic control system S is attacked, the attack analysis system 1 can analyze the attack without delay, and can quickly respond to the attack.

In the case of the part (b) of FIG. 2, the attack analysis system 1 and the electronic control system S can be connected by communication methods such as, for example, IEEE802.11 (Wi-Fi (registered trademark)), IEEE802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, 5G, and other wireless communication methods. Alternatively, dedicated short range communication (DSRC) may be used. When the vehicle is parked in a parking lot or disposed in a repair shop, a wired communication system may be used instead of a wireless communication system. For example, a local area network (LAN), the Internet, or a fixed telephone line may be used.

In the case of the part (b) of FIG. 2, when the electronic control system S mounted in the vehicle is attacked, the server device receives, from the vehicle via the wireless communication network, a security log generated by a security sensor mounted in the electronic control unit configuring the electronic control system S. Therefore, as compared with the case where the attack analysis system 1 is mounted in the vehicle, it takes time to analyze the attack and feedback the analysis result to the vehicle, but it is possible to reduce the process load on the device for the vehicle. In addition, since abundant resources of the server device can be used, it is possible to execute complex and large-scale calculations.

In the case of the part (c) of FIG. 2, the attack estimation verification device 100 implemented by the server device and the attack estimation log generation device 200 can be connected using a communication method including a wireless communication method or a wired communication method similar to the case of the part (b) of FIG. 2. Since the process load of the attack estimation and the verification process by the attack estimation verification device 100 is larger than the process load by the attack estimation log generation device 200, only the process with such a large process load is implemented using resources of the server device.

In each of the embodiments described below, an example, in which the electronic control system S to be attacked is an in-vehicle system mounted in the vehicle, will be described. However, the electronic control system S is not limited to the in-vehicle system, and can be applied to any electronic control system. For example, the electronic control system S may not be mounted in the vehicle, but may be mounted in a stationary object.

In addition to the case of analyzing the attack on the electronic control system S mounted in the vehicle, the attack analysis system 1 according to the present embodiment can use the non-installed electronic control system S as a test system for verifying whether the attack analysis method is appropriate.

Hereinafter, prior to the description of the attack estimation verification device 100 according to the first embodiment, a configuration of a peripheral equipment of the attack estimation verification device 100, that is, the configurations of the electronic control system S to be attacked and the attack estimation log generation device 200 will be described.

(2) Electronic Control System (a) Overall Configuration

Figure 3:
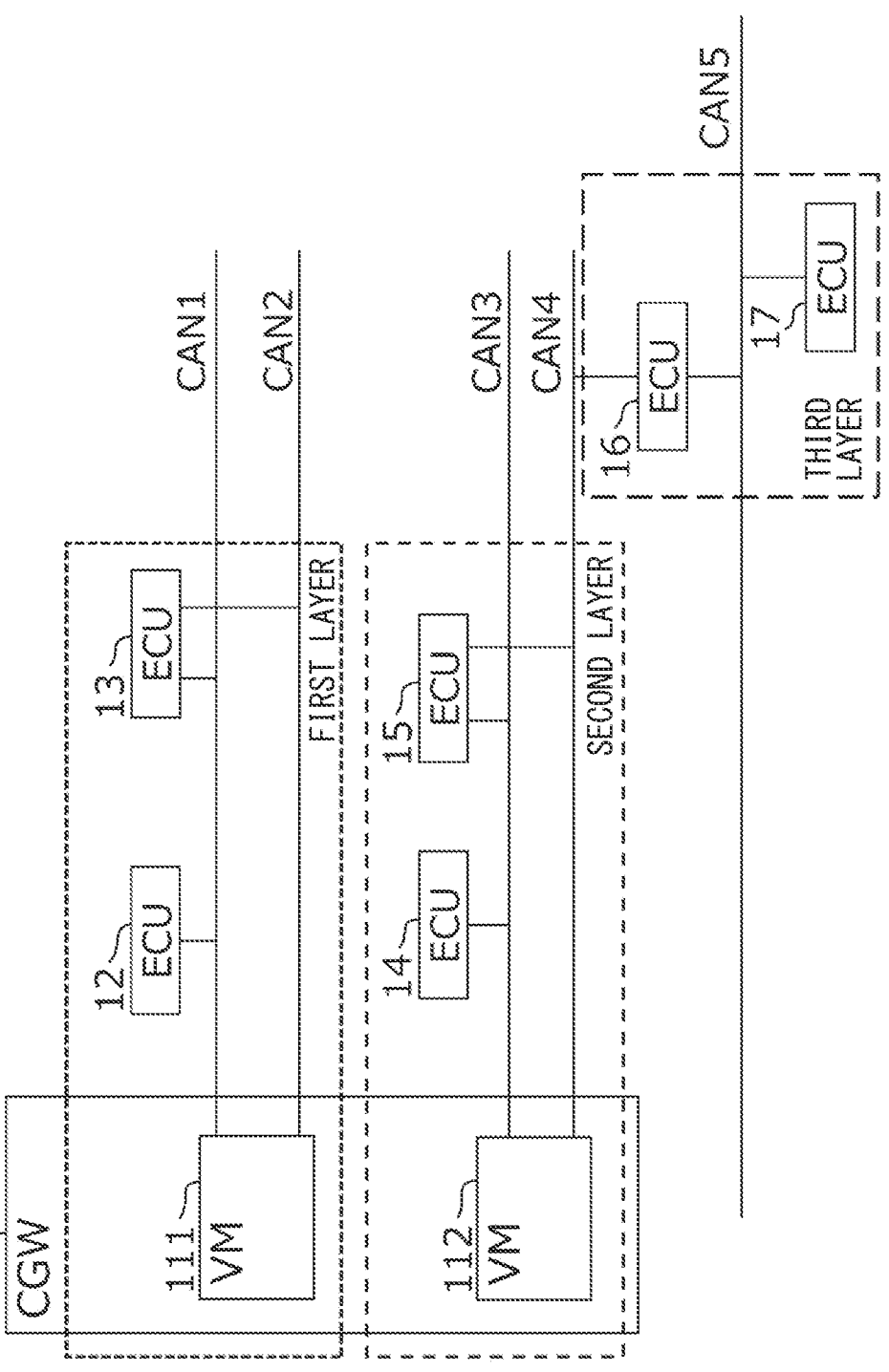
FIG. 3 is a diagram illustrating a configuration example of an electronic control system to be analyzed by the attack analysis system according to first and second embodiments.

FIG. 3 is a diagram illustrating a configuration example of the electronic control system S. The electronic control system S includes multiple electronic control units (hereafter referred to as ECUs). The electronic control system S illustrated in FIG. 3 has a CGW 11, an ECU 12, an ECU 13, an ECU 14, an ECU 15, an ECU 16, and an ECU 17.

The CGW 11 (Central Gateway) mainly has a gateway (GW) function. For example, information received via wireless communication from the outside of the vehicle is transferred to the ECUs 12 to 17 connected via the in-vehicle network. In FIG. 3, CANs 1 to 5 are exemplified as in-vehicle networks, but communication networks such as LIN and Ethernet (ETH) may be used instead of CAN. The CGW 11 can also has functions other than the gateway function. The CGW 11 shown in FIG. 3 has two virtual machines (hereinafter referred to as VMs), namely a VM 111 and a VM 112.

The ECUs 12 to 17 are ECUs connected to the CGW 11 via a network. The ECUs 12 to 17 may be any ECUs implementing each function of the vehicle, and include, for example, a drive system electronic control device controlling an engine, a steering wheel, a brake, and the like, a vehicle body system electronic control device controlling a meter, a power window, and the like, an information system electronic control device such as a navigation device, or a safety control system electronic control device performing control for preventing collision with an obstacle or a pedestrian.

In the following description, each of the CGW 11 and the ECUs 12 to 17 may be also referred to as each ECU, or simply as an ECU, unless attention is paid to the unique characteristics of the above-described CGW 11 and ECUs 12 to 17.

(b) Defense in Depth and Layers

In many electronic control systems S, defense in depth is adopted in order to improve security against attacks. According to the defense in depth, security functions are provided hierarchically and in multiple layers as countermeasures against attacks. Therefore, even when one countermeasure (that is, the first layer) is breached in the event of the attack, the next countermeasure (that is, the second layer) can defend against the attack. Therefore, it is possible to increase the defense of the electronic control system. Therefore, in the electronic control system S using the defense in depth, multiple layers with different "security levels" exist. Therefore, the electronic control system S is divided into multiple layers according to security levels, and each ECU is classified into one of layers.

Here, the "security level" is an index indicating security against attacks or deterrence against attacks.

The electronic control system S shown in FIG. 3 has three defense layers. In this example, the VM 111 of CGW 11, the ECU 12, and the ECU 13 belong to the first layer, the VM 112 of the CGW 11, the ECU 14, and the ECU 15 belong to the second layer, and the ECUs 16 and 17 belong to the third layer.

Although the electronic control unit system S in FIG. 3 has three defense layers, four or more defense layers may be provided. For example, an ECU connected via a sub-gateway ECU may be set to the fourth layer. Alternatively, an ECU called an entry point such as a TCU (Telematics Control Unit) or an IVI (In-Vehicle Infotainment system) may belong to a defense layer different from each ECU shown in FIG. 3.

(c) Security Sensor

Each ECU configuring the electronic control system S includes one or more security sensors that monitor the inside of the ECU and the network to which the ECU is connected. Upon detecting an abnormality occurring inside the ECU or in the network, the security sensor generates and outputs a security log. The security log includes abnormality information indicating that the security sensor has detected an abnormality, and identification information indicating the ECU in which abnormality has been detected. In the following embodiments, the ECU in which the abnormality has been detected will be referred to as an abnormal ECU, and the security log generated and output by the security sensor will be referred to as an individual security log. In this specification, in order to facilitate the explanation, the combination of the ECU and the reference numeral (for example, ECU 12) is used as it is as the identification information of the ECU. Examples of security sensors include firewalls, proxies, authentication, and the like. However, the security sensors are not limited to these.

In addition to the abnormality information and the identification information of the abnormal ECU, the individual security log may contain identification information for specifying the electronic control system S, position information indicating a position where the abnormality detected by the security sensor occurred, a time when the abnormality was detected, the number of abnormality detections, the order in which the abnormalities are detected, the contents of data received before the abnormality detection, IP addresses (source and destination), and the like.

(d) Domain Controller

Although not shown in FIG. 3, there is a so-called domain architecture that is a system. The domain architecture divides multiple ECUs configuring the electronic control system S into units called domains according to their functions and roles, and manages the ECU for each domain. In such a domain architecture, an ECU called a domain controller manages ECUs for each domain. When the electronic control system S of the present application is the domain architecture, the ECU that is the domain controller and the ECU that is managed by the domain controller may be likely to have different security even if they belong to the same defense layer. Therefore, the domain controller and the ECU managed by the domain controller are not determined to be in the same group, but are determined to be in different groups in the attack estimation log generation device 200, which will be described later.

(3) Attack Estimation Log Generation Device

Figure 4:
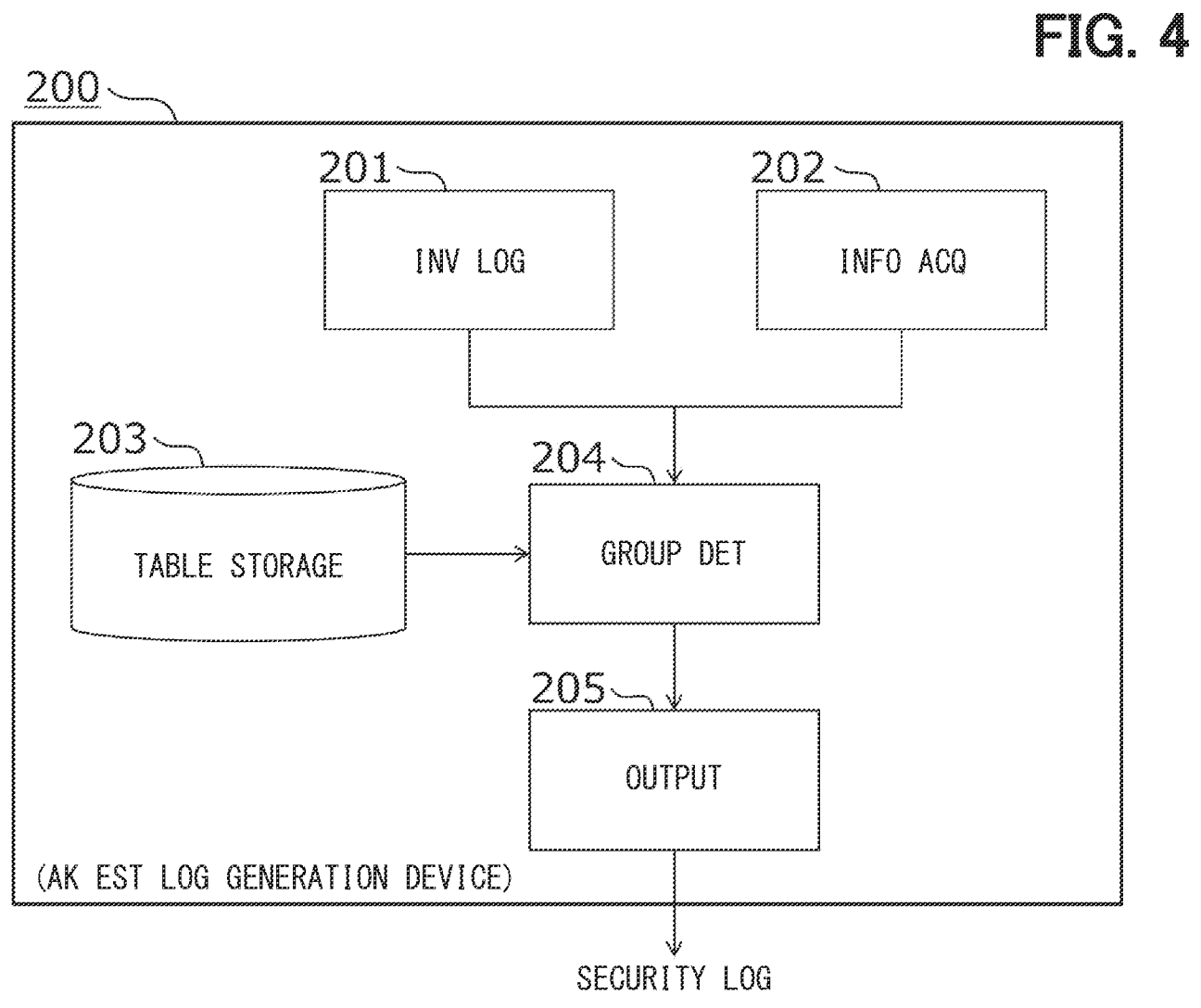

A configuration of the attack estimation log generation device 200 according to the present embodiment will be described with reference to FIG. 4. The attack estimation log generation device 200 includes an individual log acquisition unit 201, a feature number information acquisition unit 202, a feature table storage unit 203, a group determination unit 204, and an output unit 205. In the drawings, the individual log acquisition unit 201, the feature number information acquisition unit 202, the feature table storage unit 203, the group determination unit 204 and the output unit 205 may be also referred to as "INV LOG", "INFO ACQ", "TABLE STORAGE", "GROUP DET", and "OUTPUT", respectively. As described above, the attack estimation log generation device 200 is a device that generates a log necessary for the attack estimation by the verification device 100, and can be said to be a device on which the attack estimation verification device 100 is based.

The individual log acquisition unit 201 acquires the individual security log including abnormality information indicating an abnormality detected in the electronic control system S, and identification information indicating an abnormal ECU (corresponding to an "abnormal electronic control unit") that is an ECU in which the abnormality has been detected.

The feature number information acquisition unit 202 acquires feature number information indicating the maximum number of features that each ECU configuring the electronic control system S is assumed to have. For example, the user of the attack analysis system 1 inputs an arbitrary value to this feature number information.

The feature table storage unit 203 is a storage that stores the feature table indicating a correspondence relation among (i) the identification information of each ECU that configures the electronic control system S, (ii) the features "actually" had by each ECU, (iii) the features assumed to be had by each ECU, and (iv) group information set according to the features. FIGS. 5 and 6 indicate one example of the feature table. The feature assumed to be had by each ECU differ according to the feature number information acquired by the feature number information acquisition unit 202.

Therefore, the feature table storage unit 203 stores multiple feature tables for each value of the feature number information.

Here, the expression of "actually" may represent a state in which some function can be implemented using the features, and, for example, the features of the virtual machine are included in the features which the ECU actually has.

In FIGS. 5 and 6, for ease of explanation, the feature table includes features that each ECU actually has and the features that each ECU is assumed to have. However, the feature table does not necessarily contain these features. That is, the feature table may simply be a table showing the correspondence relation between the identification information of each ECU and the group information. However, in this case, the group information of the feature table is set in advance according to the features which the ECU actually has and the features which the ECU is assumed to have.

When the feature number information is always set to a constant value, the feature table storage unit 203 does not need to store a feature table for each value indicated by the feature number information. Therefore, the feature table storage unit 203 stores only one feature table. In this case, the attack estimation log generation device 200 may not include the feature number information acquisition unit 202.

The group determination unit 204 determines group information indicating the group to which the abnormal ECU belongs based on the identification information of the abnormal ECU in the individual security log. Here, the group is a group of one or more ECUs among multiple ECUs that configures the electronic control system S. The ECUs are grouped according to the features that ECUs "actually" have and the features that the ECUs are assumed to have. Hereinafter, the features that the ECU actually has are referred to as actual features, and features that the ECU is assumed to have are referred to as assumption features. Among the ECUs configuring the electronic control system S, the ECUs having the same actual feature and the assumption feature are grouped into the same group. Processes by the group determination unit 204 will be described later.

Here, the feature is, for example, a network. In this case, the feature that the ECU actually has is a network actually connected to the ECU, and the feature that the ECU is assumed to have is a network that are not actually connected to the ECU, but is assumed to be connected to the ECU.

In another example, the feature is the function of the ECU. In this case, the feature that the ECU actually has is the function that the ECU can actually exhibit, and the feature that the ECU is assumed to have is the function that the ECU cannot actually exhibit but is assumed to be able to exhibit. For example, in the case of the ECU configuring the in-vehicle system, the functions of the ECU include, for example, a function of steering the vehicle, a function of controlling communication with the outside, a function related to a navigation system, and the like. Alternatively, the function of the ECU may be the abnormality detection function that each ECU has.

The output unit 205 outputs to, the attack estimation verification device 100, the security log including the abnormality information included in the individual security log, the identification information of the abnormal ECU, and the group information determined by the group determination unit 204. This security log may include other information that was included in the individual security log.

Next, a determination process by the group determination unit 204 will be described. The group determination unit 204 determines actual features and assumption features using feature tables shown in FIGS. 5 and 6, for example. FIG. 5 is a feature table when the value indicated by the feature number information is 1 and the feature is the network. FIG. 6 is a feature table when the value indicated by the feature number information is 2 and the feature is the function of the ECU. In the drawings, the term of "function" may be also referred to as "FN".

When the individual log acquisition unit 201 acquires the individual security log, the group determination unit 204 refers to the maximum number of features indicated by the feature number information acquired by the feature number information acquisition unit 202. For example, it is assumed that the identification information of the abnormal ECU in the individual security log is ECU 12, and the feature number information acquired by the feature number information acquisition unit 202 is 1. In this case, the group determination unit 204 uses the feature table shown in FIG. 5 to determine group information of [G-01] associated with identification information of [ECU12] of the abnormal ECU.

Figure 7:
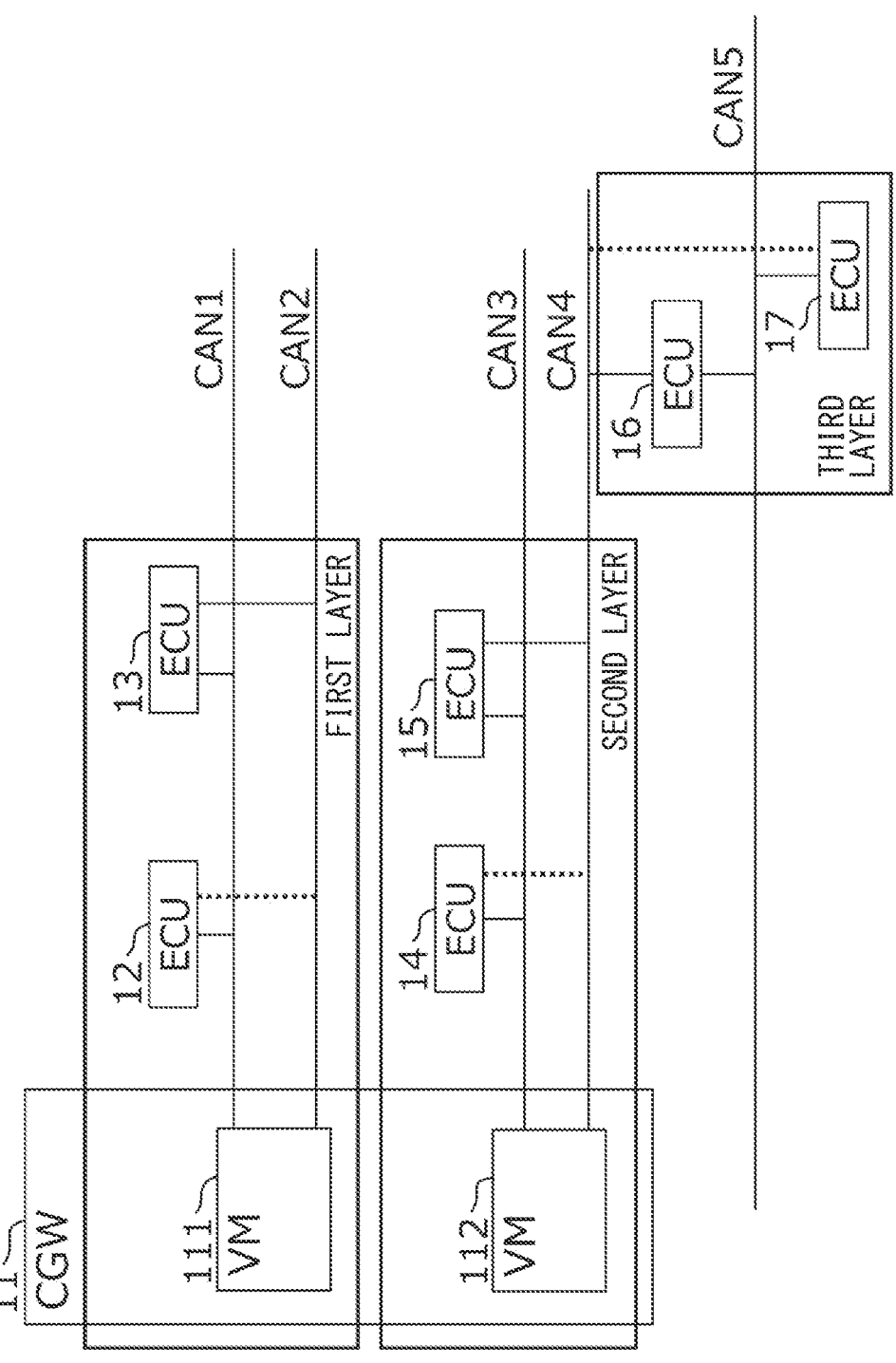
FIG. 7 is a diagram illustrating a configuration example of an electronic control system according to the first and second embodiments.

According to the feature table of FIG. 5, the actual feature of the abnormal ECU 12, that is, the network to which the abnormal ECU 12 is actually connected is CAN1, and the assumption feature of the abnormal ECU 12, that is, the network to which the abnormal ECU is assumed to be connected is CAN2. The VM 111 and the ECU 13 are actually connected to the ECU or assumed to be connected to the same network as the abnormal ECU 12, and belong to the group indicated by the group information of [G-01] that is same as the ECU 12. FIG. 7 is a diagram in which the network, which is the assumption feature, is represented by a broken line and added to the electronic control system S shown in FIG. 3. It is assumed that the CAN2 is connected to ECU 12. In FIG. 7, a network, which is the assumption features of the ECU 14 and the ECU 17, are also represented by broken lines. According to FIG. 7, it is clear that the ECU 12, the ECU 13, and the VM 111 are connected to the same network (CAN1, CAN2).

In another example, it is assumed that the identification information of the abnormal ECU in the individual security log is ECU 14, and the feature number information acquired by the feature number information acquisition unit 202 is 2. In this case, the group determination unit 204 uses the feature table shown in FIG. 6 to determine group information of [G-02] associated with identification information of [ECU14] of the abnormal ECU.

According to the feature table of FIG. 6, the actual features of the abnormal ECU 14, in other words, the functions actually had by the abnormal ECU 14 are a function A and a function D, and the assumption feature of the abnormal ECU 14, that is, the function assumed to be had by the abnormal ECU 14, in other words, the assumption function of the abnormal ECU 14 is a function E. The VM 112 and the ECU 14, which actually has or assumed to have the same function as the abnormal ECU 14, belong to the group indicated by the group information of [G-02] that is same as the ECU 14.

As shown in FIG. 3, when the electronic control system S employs the defense in depth, the group determination unit 204 may determine the security level of the ECU as a feature in addition to the features such as the network and the function described above, and may determine the group according to the layer to which the ECU belongs. In this case, it is desirable that ECUs with different security levels are not determined as being in the same group, but as being in different groups.

For example, a case where the value indicated by the feature number information is 3, that is, the maximum number of assumption features of each ECU is 3 will be described. When the assumption features of the ECU 12 are CAN2, CAN3, and CAN4, the actual and assumption features of the ECU 12 are CAN1, CAN2, CAN3, and CAN4. Further, when the assumption features of the ECU 14 are CAN1, CAN2, and CAN4, the actual and assumption features of the ECU 12 are CAN1, CAN2, CAN3, and CAN4. Therefore, the ECU 12 and the ECU 14 have the same actual features and assumption features. However, while the ECU 12 belongs to the first layer, the ECU 14 belongs to the second layer. Therefore, the ECU 12 and the ECU 14 are not determined as being in the same group.

Even when the physical configuration of the electronic control system differs depending on the type of vehicle, common security functions are arranged in the electronic control system that employs the defense in depth. Therefore, the electronic control system having any configuration can be divided into multiple layers according to the security level. Furthermore, even when the physical configurations of the electronic control system are different, the ECUs to be protected by the respective defense layers is likely to have commonality. Therefore, by grouping the ECUs according to the security level of the electronic control system and the network and functions of each ECU, the group of the electronic control system S becomes a group that has commonality with other electronic control system groups. As a result, it becomes possible to apply common attack analysis rules to the electronic control system S and other electronic control systems.

In addition, although the network and the function are illustrated as features that the ECU has, the features are not limited to these. Further, the group determination unit 204 may determine the group to which the ECU belongs based on multiple features with different types, that is, both of the network and the function, as the features of the ECU.

Although one network or one function corresponds to one feature in this specification, multiple networks or multiple functions of the ECU may be collectively defined as a feature in this specification. In this case, the maximum number of features acquired by the feature number information acquisition unit 202 indicates the number of assumption features included in the features.

As shown in FIG. 2*b*, when the attack analysis system 1 is a server device, the attack estimation log generation device 200 acquires individual security logs from a large number of vehicles, and generates the security logs. Therefore, the feature table storage unit 202 needs to store a large number of feature tables corresponding to the electronic control systems of each vehicle. Therefore, in order to easily specify the feature table to be used by the group determination unit 204, the individual security log preferably contains information specifying the electronic control system. Thereby, the group determination unit 204 can easily identify the feature table used to determine the features that the ECUs included in the individual security log actually have or are assumed to have.

(4) Attack Estimation Verification Device

Figure 8:
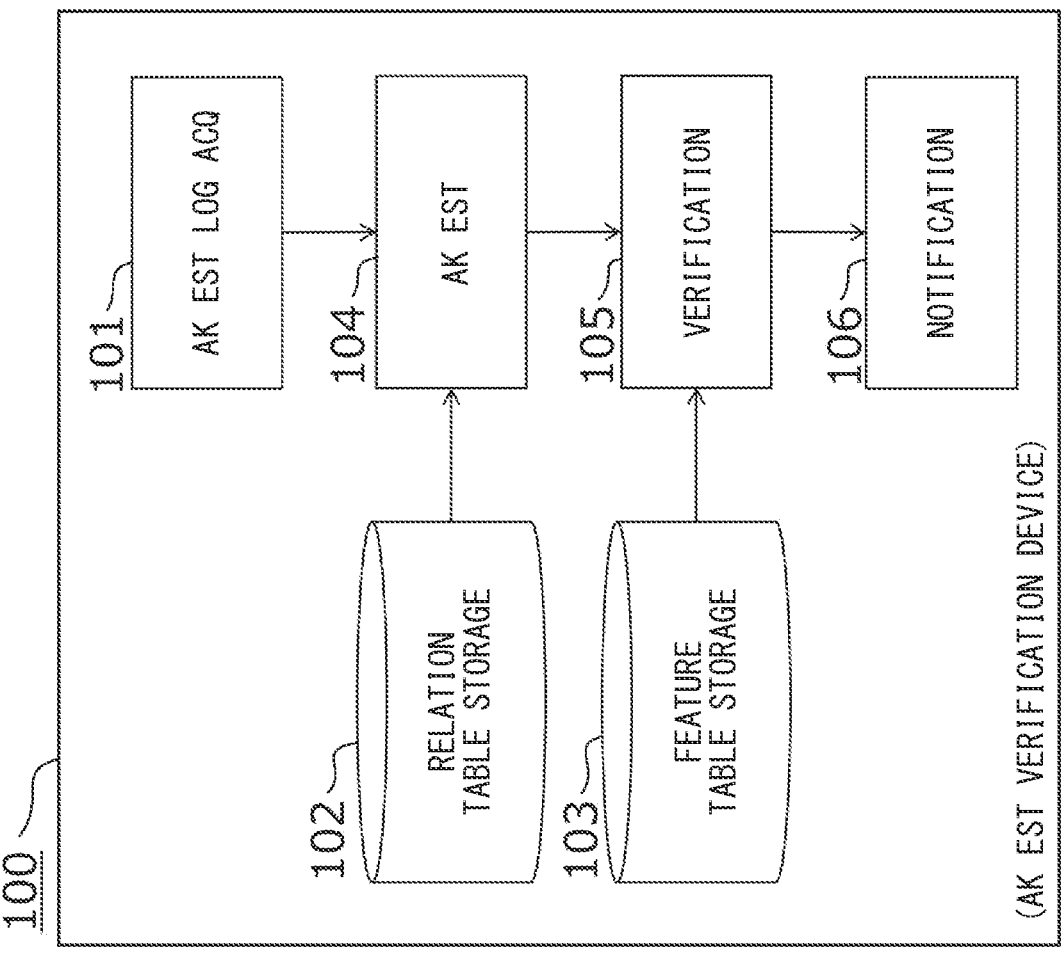
FIG. 8 is a block diagram showing a configuration example of an attack estimation verification device according to the first and second embodiments.

Next, the attack estimation verification device 100 according to the present embodiment will be described with reference to FIG. 8. The attack estimation verification device 100 includes an attack estimation log acquisition unit 101, an attack-abnormality relation table storage unit 102, a feature table storage unit 103, an attack estimation unit 104, a verification unit 105, and a notification unit 106. In the drawings, the attack estimation log acquisition unit 101, the attack-abnormality relation table storage unit 102, the feature table storage unit 103, the attack estimation unit 104, the verification unit 105, and the notification unit 106 may be also referred to as "AK EST LOG ACQ", "RELATION TABLE STORAGE", "FEATURE TABLE STORAGE", "AK EST", "VERIFICATION", and "NOTIFICATION", respectively.

The attack estimation log acquisition unit 101 (corresponding to a "log acquisition unit") "acquires" a security log for attack estimation output from the attack estimation log generation device 200. As described above, the security log acquired by the log acquisition unit 101 includes identification information indicating an abnormal ECU, abnormality information indicating an abnormality detected in the abnormal ECU, and group information indicating a group to which the abnormal ECU belongs.

The expression of "acquire" may mean both of a case of acquiring a security log from an external device and a case of acquiring a security log generated by the attack estimation verification device itself.

The attack-abnormality relation table storage unit 102 is a storage unit that stores an attack-abnormality relation table. The attack-abnormality relation table is a table showing a correspondence relation among attack information indicating the type of attack that the electronic control system is expected to receive, and prediction abnormality information indicating an abnormality that is predicted to occur in the electronic control system when attacked, and prediction group information indicating a group in which the predicted abnormality occurs. The attack-abnormality relation table is not a table specific to the electronic control system S, but a table that is also used for attack estimation of other electronic control systems having configurations different from the electronic control system S.

FIG. 9 is a diagram showing one example of the attack-abnormality relation table. In the drawings, the term of "abnormality" may be also referred to as "ABL". The attack-abnormality relation table shown in FIG. 9 shows, for each type of attacks (attacks A to X), abnormalities that occur when the electronic control system receives the attack and groups in which the abnormalities may occur. FIG. 9 further shows the correspondence relation between the types of attacks and the assumed attack start points and attack targets in the event of the cyberattack. Neither the attack start point nor the attack target indicates an ECU unique to the configuration of the electronic control system S, but they are groups to which the ECU of the attack start point and the attack target belong. Therefore, the attack start point and the attack target are referred to as an attack start point group and an attack target group, respectively. An abnormality A in FIG. 9 indicates that an abnormality has occurred in the function A of the ECU.

For example, upon receiving an attack whose attack type is attack A, the electronic control system predicts that abnormalities A and C will occur in the ECUs belonging to the group of [G-01]. Also, the attack start point group of the attack A is the group indicated by an identification number of [G-00], and the attack target group is the group indicated by the identification number of [G-01]. In addition to the case where the attack start point is inside the electronic control system, a case where the attack start point is outside the electronic control system is assumed. The case where the attack start point is outside the electronic control system means a case of receiving the attack from the outside of the vehicle. The identification number of [G-00] indicates that the attack start point is outside the electronic control system.

Although FIG. 9 shows one attack-abnormality relation table, the attack-abnormality relation table storage unit 102 stores the attack-abnormality relation table for each value indicated by the feature number information. This is because, when the maximum number of temporary features is different, the group to which the abnormal ECU belongs may be different in the attack estimation log generation device 200, and the attack-abnormality relation table to be used for the attack estimation is also different.

The feature table storage unit 103 is a storage that stores the same feature table as the feature table of the attack estimation log generation device 200. That is, the feature table storage unit 103 stores feature tables as shown in FIGS. 5 and 6, for example.

The attack estimation unit 104 estimates the type of attack received by the electronic control system S using the attack-abnormality relation table. Specifically, the attack estimation unit 104 specifies, from the attack-abnormality relation table, a combination of the prediction abnormality information and the prediction group information, the combination "corresponding to a combination" of the abnormality information and the group information in the security log acquired by the log acquisition unit 201. The combination of the prediction abnormality information and the prediction group information may be also referred to as a prediction combination. When there is no prediction combination corresponding to the combination of the abnormality information and the group information in the attack-abnormality relation table, the attack estimation unit 104 specifies the closest combination from among prediction combinations in the attack-abnormality relation table. Then, the attack estimation unit 104 estimates the attack type indicating the closest combination to be a type of the attack received by the electronic control system.

Here, the expression of "corresponding to the combination" may mean that the combination matches or is a similar combination.

For example, a case where, the abnormality information included in the security log indicates an abnormality A and an abnormality E and the group information indicates G-02, will be described. In this case, the attack estimation unit 104 specifies the prediction combination corresponding to the combination of the abnormality information (abnormality A and abnormality E) and the group information (G-02) from the attack-abnormality relation table. In the example of FIG. 9, a prediction combination of an attack B matches a combination of the abnormality information (abnormality A and abnormality E) and the group information (G-02). Therefore, the attack estimation unit 104 estimates that the type of attack received by the electronic control system S is the attack B.

When the security log includes the order of abnormality occurrences and the number of times of abnormality occurrences indicated by the abnormality information, the attack estimation unit 104 may further use the information when estimating the attack type. In this case, the attack-abnormality relation table includes the abnormality occurrence order and the abnormality occurrence number as the prediction abnormality information.

When there are multiple closest combinations, the attack estimation unit 104 estimates that the type of attack received by the electronic control system S is one of the corresponding multiple attacks. For example, it is considered that the abnormality information indicates an abnormality D and the group information indicates G-02. In FIG. 9, there is no prediction combination that matches the combination of the abnormality information (abnormality D) and the group information (G-02). However, the attack corresponding to the combination of the prediction abnormality information (abnormality D) and the group information (G-02) is included in attacks A and D. Therefore, the attack estimation unit 104 estimates that the type of attack received by the electronic control system S is either the attack C or the attack D.

In addition to estimating the type of attack received by the electronic control system S, the attack estimation unit 104 further estimates the attack start point group and attack target group of the attack. As shown in FIG. 9, since the attack-abnormality relation table stores the attack type, the attack start point group, and the attack target group in association with each other, the attack estimation unit 104 can use the attack-abnormality relation table to estimate the attack start point group and the attack target group.

The verification unit 105 verifies whether the grouping of ECUs by the attack estimation log generation device 200 or the features assumed to be had by the abnormal ECU are appropriate. Specifically, when the attack of the attack type estimated by the attack estimation unit 104 is an attack related to the features assumed to be had by the abnormal ECU, the verification unit 105 determines that the grouping of the ECUs or the feature assumed to be had by the abnormal ECU is not appropriate. Detailed processes of the verification unit 105 will be described later.

The notification unit 106 notifies the user of the attack analysis system 1 of the verification result by the verification unit 105. The method of notification by the notification unit 106 is arbitrary. For example, the notification unit 106 notifies the user of the verification result by audio or text. Only when the verification unit 105 determines that the grouping of the ECUs or the feature assumed to be had by the abnormal ECU in the attack estimation log generation device 200 is not appropriate, the notification unit 106 may notify the user of the verification result.

Next, a verification method by the verification unit 105 will be described. First, the verification method by the verification unit 105 in a case where the feature is a network will be described.

For example, it is assumed that the attack estimation unit 104 estimates that the attack type is attack D shown in FIG. 9, the attack start point group is [G-02], and the attack target group is [G-03]. According to FIG. 3 or FIG. 7, the group [G-02] and the group [G-03] are connected via the CAN4, so an attack path of the attack D is via the CAN4. Therefore, the CAN4 is the network associated with the attack D.

Here, the verification unit 105 refers to the feature table stored in the feature table storage unit 103 to identify the assumption feature of the abnormal ECU indicated by the identification information included in the security log. When the identification information indicates the ECU 15, there is no network assumed to be connected to the ECU 15 according to the feature table shown in FIG. 5. That is, the attack D estimated by the attack estimation unit 104 is not an attack related to the network assumed to be connected to the abnormal ECU 15 indicated by the identification information. In this case, the verification unit 105 can determine that the grouping of ECUs is appropriate.

On the other hand, when the identification information indicates the ECU 14, the network assumed to be connected to the ECU 14 is the CAN4 according to the feature table shown in FIG. 5. The verification unit 105 determines the assumption feature of the abnormal ECU as the CAN4. As described above, the attack D estimated by the attack estimation unit 104 is the attack carried out via the CAN4, and is an attack via a network assumed to be connected to the abnormal ECU 14. Therefore, the verification unit 105 determines that the grouping of the ECUs is not appropriate, or that the feature assumed to be had by the abnormal ECU 14 is not appropriate.

Next, a verification method by the verification unit 105 in a case where the feature is the function of the ECU will be described.

For example, it is assumed that the attack estimation unit 104 estimates that the attack type shown in FIG. 9 is the attack A. As in the above-described example, the verification unit 105 refers to the feature table stored in the feature table to identify the assumption feature of the abnormal ECU indicated by the identification information included in the security log.

When the identification information indicates the ECU 12, according to the feature table shown in FIG. 6, the function assumed to be had by the ECU 12 is a function B. The verification unit 105 determines that the assumption feature of the abnormal ECU 12 is the function B. Here, the attack A estimated by the attack estimation unit 104 is an attack when the abnormality A and the abnormality C occur, and is an attack when the abnormalities occur in function A and the function C. Accordingly, the attack is not related to the feature (function B) assumed to be had by the abnormal ECU 12 indicated by the identification information. In this case, the verification unit 105 can determine that the grouping of ECUs and the functions assumed to be had by the abnormal ECU are appropriate.

On the other hand, when the identification information indicates the ECU 13, according to the feature table shown in FIG. 6, the functions assumed to be had by the ECU 13 are functions A and B. The verification unit 105 determines that the assumption features of the abnormal ECU 13 are the features A and B. As described above, the attack A estimated by the attack estimation unit 104 is an attack when the abnormality A occurs, and is an attack on the function (function A) assumed to be had by the abnormal ECU 13. Therefore, the verification unit 105 determines that the grouping of the ECUs is not appropriate, or that the feature assumed to be had by the abnormal ECU 13 is not appropriate.

The user of the attack analysis system 1 can improve the accuracy of attack estimation and verification by resetting the feature table or the features assumed to be had by the ECU based on the notification from the notification unit 106. In particular, when the attack analysis system 1 is a test system, before operating the attack analysis using an actual vehicle, it is possible to verify whether the feature table or the feature assumed to be had by the ECU is appropriate in the test environment. After operation, it is possible to perform attack estimation in consideration of the appropriate feature table or the appropriate feature. In the test system, even though the feature table or the feature assumed to be had by the ECU has been verified, when an attack related to the feature assumed to be had by the abnormal ECU is received after operation, the feature table may be falsified. In such a case, the user who receives the notification from the notification unit 106 may use a hash value to verify falsification of the feature table.

Figure 10:
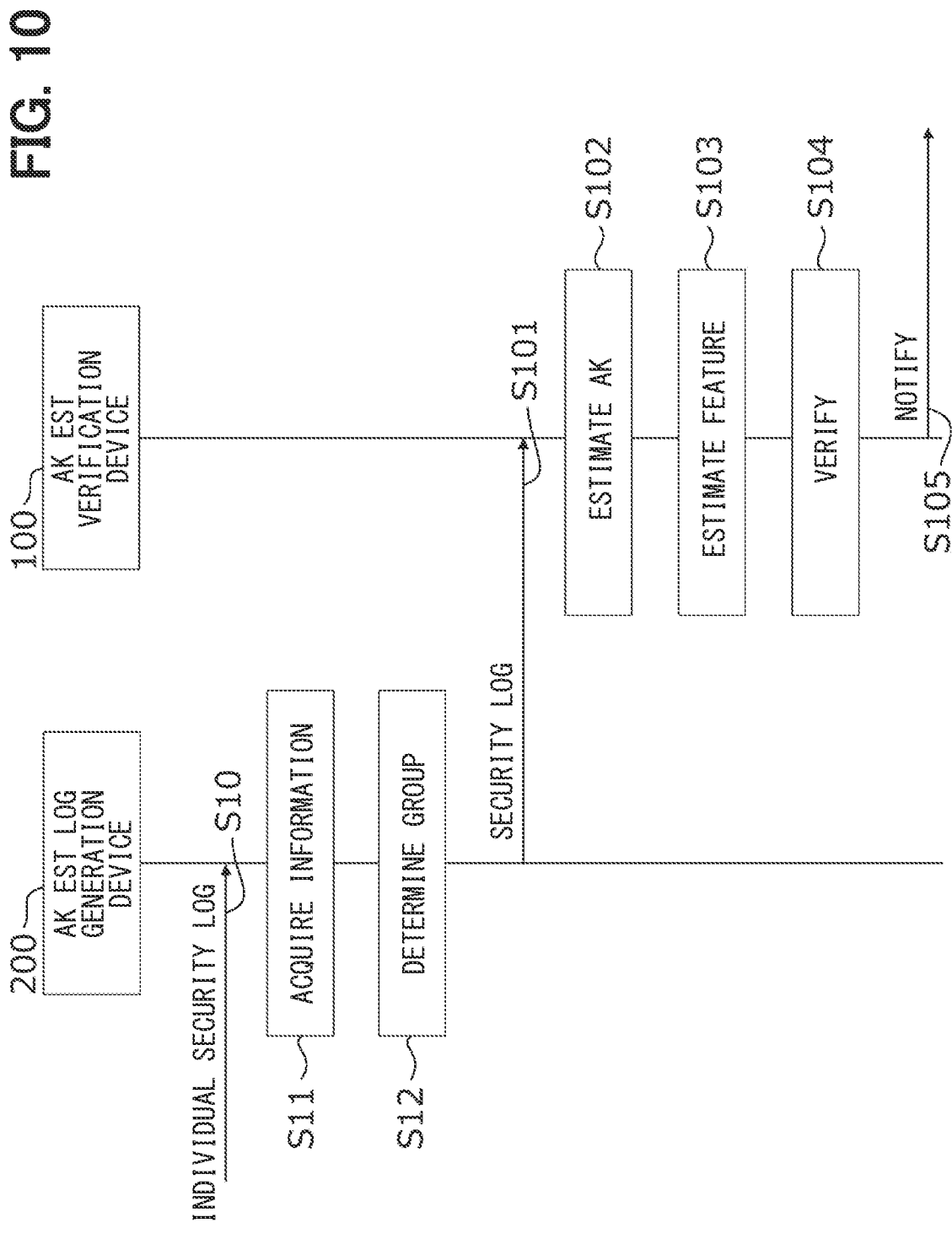
FIG. 10 is a flowchart showing an operation of the attack analysis system according to the first and second embodiments.

(5) Operation of Attack Analysis System and Attack Estimation Verification Device Next, operation of the attack analysis system 1 will be described with reference to FIG. 10. FIG. 10 not only shows the method executed by the attack analysis system 1, but also shows the process procedure of the program executable by the attack analysis system 1. The order of the process procedure is not limited to the specific order shown in FIG. 10. That is, the order may be properly changed as long as there is no restriction such as a relationship in which a result of a previous process is used in a subsequent process.

The individual log acquisition unit 201 of the attack estimation log generation device 200 acquires the individual security log generated by the ECU that configures the electronic control system S (S10). After the acquisition of the individual security log in S101, the feature number information acquisition unit 202 acquires feature number information indicating the maximum number of assumption features (S11).

The group determination unit 204 determines the group to which the abnormal ECU belongs based on the identification information of the abnormal ECU in the individual security log (S12). Then, the output unit 205 outputs, to the attack estimation-verification device 100, the security log including the abnormality information in the individual security log, the identification information, and the group information indicating the group determined in S12.

The log acquisition unit 101 of the attack estimation verification device 100 acquires the security log output from the attack estimation log generation device 200 (S101).

The attack estimation unit 104 estimates the attack received by the electronic control system S based on the prediction combination corresponding to the combination of the abnormality information and the group information in the security log (S102).

The verification unit 105 determines the assumption feature of the abnormal ECU based on the identification information (S103). Next, when the attack estimated in S102 is an attack related to the assumption feature determined in S103, the verification unit 105 executes the verification process of determining that the grouping of the groups is not appropriate, or the feature assumed to be had by the ECU is not appropriate (S104). Then, the notification unit 106 notifies the user of the attack estimation verification device 100 of the verification result by the verification unit 105 (S105).

(6) Interim Overview

As described above, according to the attack analysis system 1 and the attack estimation verification device 100 of the present disclosure, when the electronic control system S is attacked, the multiple ECUs configuring the electronic control system S are grouped and the attack estimation is performed in consideration of not only the feature actually had by the ECU but also the feature assumed to be had by the ECU. Further, it is verified whether the process of grouping the ECUs is appropriate using the attack estimation result. Thereby, when the grouping of the ECUs is not appropriate or when the feature assumed to be had by the ECU is not appropriate, it is possible to implement the highly accurate attack estimation by feeding back the verification results to the user.

Further, according to the attack analysis system 1 and the attack estimation verification device 100 of the present disclosure, it becomes unnecessary to provide tools for estimating and verifying attacks for each of the many ECUs configuring the electronic control system S or for each of multiple electronic control systems with different configurations. Therefore, it is possible to easily manage devices and programs for estimating attacks, and to reduce the process load required for estimating attacks. Furthermore, the device and the system can be applied even when the number and configuration of the ECUs configuring the electronic control system are changed in the future.

(7) Modification

In the above-described first embodiment, the configuration, in which the attack estimation verification device 100 stores the same feature table as the attack estimation log generation device 200 in the feature table storage unit 103, has been described. In the present modification, a configuration, in which the attack estimation verification device 100 does not include the feature table, will be described.

When the attack estimation verification device 100 does not includes the feature table, the verification unit 105 of the attack estimation verification device 100 cannot determine the feature assumed to be had by the abnormal ECU. As a result, the verification unit 105 cannot perform the grouping of ECUs and verify whether the feature assumed to be had by the abnormal ECU is appropriate. Therefore, the attack estimation log acquisition unit 101 according to the present modification acquires, from the attack estimation log generation device 200, a security log including information indicating the assumption feature of the abnormal ECU in addition to the abnormality information, the identification information, and the group information. Thereby, the attack estimation verification device 100 can group ECUs and verify whether the feature assumed to be had by the abnormal ECU is appropriate, without having the feature table.

Alternatively, the attack estimation log acquisition unit 101 according to the present modification may acquire a security log including information indicating the actual feature of the abnormal ECU instead of the information indicating the assumption feature of the abnormal ECU. However, in this case, the attack estimation verification device 100 needs to store, in a memory or the like in advance, information indicating the actual feature and the assumption feature of each group. Then, the difference between the actual feature and the assumption feature stored in the memory or the like and the actual feature in the security log is determined to be the assumption feature of the abnormal ECU.

2. Second Embodiment

In the first embodiment, the case where the attack estimation verification device 100 and the attack estimation log generation device 200 are different devices has been described. In contrast, in the present embodiment, the attack estimation verification device 100 and the attack estimation log generation device 200 are configured as an integrated device. A device that integrally including the attack presumption verification device 100 and the attack estimation log generation device 200 is referred to as an attack analysis device (corresponding to an "attack estimation verification device") 110.

Since the configurations, functions, and operations of the attack estimation verification device 100 and the attack estimation log generation device 200 in the present embodiment are the same as those in the first embodiment, description thereof will be omitted. In the first embodiment, the feature table storage unit 103 of the attack estimation verification device 100 and the feature table storage unit 203 of the attack estimation log generation device 200 each store the feature table. However, in the present embodiment, the attack analysis device 110 only needs to have one feature table storage unit. The same feature table is referred to in the process of generating the security log by the attack estimation log generation device 200 and the process of verifying the attack estimation result by the attack estimation verification device 100.

The attack analysis device 110 and the electronic control system S according to the present embodiment can be arranged in the same manner as in FIGS. 2*a* and 2*b* according to the first embodiment. That is, the attack analysis device 110 may be mounted in a vehicle, which is the "mobile object", or may be implemented by the server device.

3. Overview

The features of the attack estimation verification device and the like according to the embodiments of the present disclosure have been described above.

Terms used in the description of each embodiment are examples and may be replaced with synonymous terms or terms having a synonymous function.

The block diagrams used for the description of the embodiments are obtained by classifying and arranging the configuration of the device for each function. The blocks representing the respective functions may be implemented by any combination of hardware or software. Since the block diagrams illustrate the functions, the block diagrams can be understood as disclosure of the method and the program implementing the corresponding method.

Functional blocks that can be understood as processes, flows, and methods described in the respective embodiments may be changed in order as long as there are no restrictions such as a relationship in which results of preceding other steps are used in one step.

The terms such as first, second, to N-th (where N is an integer) used in each embodiment and in the claims are used to distinguish two or more configurations and methods of the same kind and are not intended to limit the order or superiority.

In the above-described embodiments, the attack analysis system and the attack estimation verification device for the vehicle analyzes the attacks on the electronic control system mounted in the vehicle. However, the present disclosure may be used for the system for special devices or general purpose devices other than vehicles.

Further, examples of the attack estimation verification device described in the present disclosure include the following.

As an electronic component, the device may include semiconductor elements, electronic circuits, modules, microcomputers. As a semi-finished product, the device may include electronic control units (ECU) and system boards. As a completely finished product, the device may include a mobile phone, a smartphone, a tablet, a personal computer (PC), a workstation, or a server. Other examples may include devices having communication functions, such as a video camera, a still camera, or a car navigation system.

The attack estimation verification device may additionally include necessary functions such as an antenna and a communication interface.

The present disclosure is implemented not only by dedicated hardware having a configuration and a function described in relation to each embodiment. The present disclosure can also be implemented as a combination of a program for implementing the present disclosure, recorded on such a recording medium as memory and a hard disk and general-purpose hardware including dedicated or general-purpose CPU, memory, or the like, capable of executing the program.

A program stored in a non-transitory tangible storage medium (for example, an external storage device (a hard disk, a USB memory, a CD/BD, or the like) of dedicated or general-purpose hardware, or an internal storage device (a RAM, a ROM, or the like)) may also be provided to dedicated or general-purpose hardware via the recording medium or from a server via a communication line without using the recording medium. Consequently, as the program is upgraded, the corresponding latest function can be always provided.

INDUSTRIAL APPLICABILITY

The attack estimation verification device of the present disclosure is intended mainly for a device that estimates the attacks received by the in-vehicle electronic control system installed in a car and verifies the results. However, the attack estimation verification device may be intended for a device that estimates attacks on a system other the in-vehicle electronic control system and verifies the results.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:

1. An attack estimation verification device comprising:
a processor and memory configured to:
acquire a security log including:
identification information indicating an abnormal electronic control unit that is an electronic control unit in which an abnormality is detected among a plurality of electronic control units configuring an electronic control system;
abnormality information indicating the abnormality detected in the abnormal electronic control unit; and
group information indicating a group
which is obtained by grouping at least one electronic control unit among the plurality of electronic control units according to an actual feature of each of the plurality of electronic control units and an assumption feature assumed to be a function of each of the plurality of electronic control units, and
to which the abnormal electronic control unit belongs;
store an attack-abnormality relation table indicating a relation among attack information indicating a type of an attack,
prediction abnormality information indicating an abnormality predicted to occur due to the attack, and
prediction group information indicating a group in which the predicted abnormality occurs;
estimate an attack received by the electronic control system based on a prediction combination of the prediction abnormality information and the prediction group information, the prediction combination corresponding to a combination of the abnormality information and the group information;
determine that grouping of the group or an assumption feature, which is assumed to be a feature of the abnormal electronic control unit indicated by the identification information, is not appropriate when the attack estimated by the attack estimation unit is an attack related to the assumption feature indicated by the identification information; and
provide a notification indicating a verification result.

2. The attack estimation verification device according to claim 1, wherein
the feature is a network that is actually connected to or assumed to be connected to each of the plurality of electronic control units, and
the processor and memory are further configured to determine that the grouping of the group or a network assumed to be connected to the abnormal electronic control unit is not appropriate when the estimated attack is an attack via the network assumed to be connected to the abnormal electronic control unit.

3. The attack estimation verification device according to claim 2, wherein
the feature is also a layer to which each of the plurality of electronic control units belongs among a plurality of layers that are divided according to a security level of the electronic control system.

4. The attack estimation verification device according to claim 1, wherein
the feature is an actual function or an assumption function of each of the plurality of electronic control units, and
the processor and memory are further configured to determine that the grouping of the group or an assumption function assumed to be a function of the abnormal electronic control unit is not appropriate when the estimated attack is an attack on the assumption function.

5. The attack estimation verification device according to claim 4, wherein
the feature is also a layer to which each of the plurality of electronic control units belongs among a plurality of layers that are divided according to a security level of the electronic control system.

6. The attack estimation verification device according to claim 1, further comprising
a feature table storage that stores a feature table indicating a correspondence relation between the identification information and a feature that is the actual feature or the assumption feature of the abnormal electronic control unit,
wherein
the processor and memory are further configured to specify the feature of the abnormal electronic control unit by using the feature table.

7. The attack estimation verification device according to claim 1, wherein
the security log further includes information indicating the assumption feature of the abnormal electronic control unit.

8. The attack estimation verification device according to claim 1, wherein the processor and memory are further configured to:
acquire an individual security log including the identification information and the abnormality information;
determine a group to which the abnormal electronic control unit belongs based on the identification information; and
output the security log including the identification information, the abnormality information, and the group information indicating the determined group.

9. The attack estimation verification device according to claim 8, wherein the processor and memory are further configured to:
acquire feature number information indicating a maximum number of a feature of each of the plurality of electronic control units, and determine the assumption feature of the abnormal electronic control unit based on the feature number information.

10. The attack estimation verification device according to claim 1, wherein the attack estimation verification device and the electronic control system are mounted in a mobile object.

11. The attack estimation verification device according to claim 1, wherein the electronic control system is an electronic control system mounted in a mobile object, and the attack estimation verification device is a server device placed outside the mobile object.

12. An attack estimation verification method executed by an attack estimation verification device including an attack-abnormality relation table storage that stores an attack-abnormality relation table indicating a relation among attack information indicating a type of an attack, prediction abnormality information indicating an abnormality predicted to occur due to the attack, and prediction group information indicating a group in which the predicted abnormality occurs, the method comprising:

acquiring a security log including:

identification information indicating an abnormal electronic control unit that is an electronic control unit in which an abnormality is detected among a plurality of electronic control units configuring an electronic control system, each of the plurality of electronic control units having a processor and memory;

abnormality information indicating an abnormality detected in the abnormal electronic control unit; and group information indicating a group which is obtained by grouping at least one electronic control unit among the plurality of electronic control units according to an actual feature of each of the plurality of electronic control units and an assumption feature of each of the plurality of electronic control units, and to which the abnormal electronic control unit belongs;

estimating an attack received by the electronic control system based on a prediction combination of the prediction abnormality information and the prediction group information, the prediction combination corresponding to a combination of the abnormality information and the group information;

determining that grouping of the group or an assumption feature of the abnormal electronic control unit indicated by the identification information is not appropriate when the estimated attack is an attack related to the assumption feature of the abnormal electronic control unit indicated by the identification information; and providing a notification indicating a verification result.

13. A computer-readable non-transitory storage medium storing an attack estimation verification program executed by an attack estimation verification device including an attack-abnormality relation table storage that stores an attack-abnormality relation table indicating a relation among attack information indicating a type of an attack, prediction abnormality information indicating an abnormality predicted to occur due to the attack, and prediction group information indicating a group in which the predicted abnormality occurs, wherein the program is configured to cause a processor to:

acquire a security log including:

identification information indicating an abnormal electronic control unit that is an electronic control unit in which an abnormality is detected among a plurality of electronic control units configuring an electronic control system, each of the plurality of electronic control units having a processor and memory;

abnormality information indicating an abnormality detected in the abnormal electronic control unit; and group information indicating a group which is obtained by grouping at least one electronic control unit among the plurality of electronic control units according to an actual feature of each of the plurality of electronic control units and an assumption feature of each of the plurality of electronic control units and to which the abnormal electronic control unit belongs;

estimate an attack received by the electronic control system based on a prediction combination of the prediction abnormality information and the prediction group information, the prediction combination corresponding to a combination of the abnormality information and the group information;

determine that grouping of the group or an assumption feature of the abnormal electronic control unit indicated by the identification information is not appropriate when the estimated attack is an attack related to the assumption feature of the abnormal electronic control unit indicated by the identification information; and provide a notification indicating a verification result.

* * * * *